(12) United States Patent
Vityaz

(10) Patent No.: US 10,565,302 B2
(45) Date of Patent: Feb. 18, 2020

(54) METHOD OF ORGANIZING DIALOG WITH THE USE OF FILLABLE FORMS

(71) Applicant: Oleksandr Vityaz, Dnipro (UA)

(72) Inventor: Oleksandr Vityaz, Dnipro (UA)

( * ) Notice: Subject to any disclaimer, the term of this patent is extended or adjusted under 35 U.S.C. 154(b) by 0 days.

(21) Appl. No.: 16/281,814

(22) Filed: Feb. 21, 2019

(65) Prior Publication Data
US 2019/0188252 A1    Jun. 20, 2019

Related U.S. Application Data

(63) Continuation-in-part of application No. 15/167,351, filed on May 27, 2016, now abandoned.

(60) Provisional application No. 62/166,715, filed on May 27, 2015.

(51) Int. Cl.
| | | |
|---|---|---|
| G06F 17/24 | (2006.01) | |
| G06F 3/0484 | (2013.01) | |
| G06F 9/54 | (2006.01) | |
| H04L 29/08 | (2006.01) | |
| G06F 3/0482 | (2013.01) | |

(52) U.S. Cl.
CPC ......... *G06F 17/243* (2013.01); *G06F 3/0482* (2013.01); *G06F 3/04845* (2013.01); *G06F 9/547* (2013.01); *H04L 67/14* (2013.01); *H04L 67/36* (2013.01)

(58) Field of Classification Search
USPC ........................................................ 709/206
See application file for complete search history.

(56) References Cited

U.S. PATENT DOCUMENTS

| | | | |
|---|---|---|---|
| 6,460,042 B1 | 10/2002 | Hitchcock et al. | |
| 7,949,587 B1* | 5/2011 | Morris | G06Q 20/0425 235/379 |
| 8,316,309 B2 | 11/2012 | Bartek et al. | |
| 8,522,203 B1 | 8/2013 | Tibbett et al. | |
| 9,805,014 B2 | 10/2017 | Ramakrishnan et al. | |
| 2008/0046807 A1* | 2/2008 | Margitich | G06Q 10/107 715/222 |
| 2014/0195621 A1* | 7/2014 | Rao DV | H04L 12/1827 709/206 |
| 2016/0062972 A1* | 3/2016 | Ramakrishnan | G06F 17/243 715/226 |

* cited by examiner

*Primary Examiner* — Hermon Asres
(74) *Attorney, Agent, or Firm* — Patent Ventures, LLC

(57) ABSTRACT

Network dialog uses electronically fillable forms, whereby messaging provides structured input, for example, to enable automated processing of transmitted data without dialog termination. Improved information transmission method advantageously enhances efficiency of written communication between dialog participants, increased communication speed, simplifies communication process, reduces errors during information input and transfer, and generally improves communication quality between dialog participants by managing dialog scenario adaptively and/or predictably according to form questions posted, and results presented accordingly in external systems.

10 Claims, 10 Drawing Sheets

METHOD OF ORGANIZING DIALOG WITH THE USE OF FILLABLE FORMS

CROSS-REFERENCE TO RELATED APPLICATION

This application is a continuation-in-part application under 30 U.S.C. 120 of U.S. patent application Ser. No. 15/167,351, filed May 27, 2016 which claims the benefit under 35 U.S.C. 119(e) of U.S. provisional patent application No. 62/166,715 for "Method of Organizing Dialog with the Use of Fillable Forms", filed on May 27, 2015, which is incorporated herein by reference.

FIELD OF INVENTION

The invention pertains generally to the field of digital communications, and more particularly to electronic messaging and dialog via a telecommunications network.

BACKGROUND OF INVENTION

Conventional chat or messaging communications among users in a digital network often require transmission of alphanumeric, text, or other bulky data from one dialog participant to another. Data transfers requested via manual input of information in a program text window designed for chat dialogs, in particular, suffer various deficiencies, such as: inadequate structure of text field data, large variety of presentation formats of user input data, time-consuming procedures for receiving information due to data transfer from chat window to other information systems, as well as errors arising during process of manual text input and data transfer. Thus, there is need for improved dialog in network communications.

SUMMARY

The invention resides in enabling electronic dialog predictably and/or adaptively using fillable forms, i.e., by modifying messaging to provide structured input, thereby automating processing of transmitted data without dialog termination.

Advantageously, form-structured information transmission enhances efficiency of written communication between dialog participants, increased communication speed, simplifies communication process, reduces errors during information input and transfer, and improves communication quality between dialog participants by managing dialog scenario according to form questions posted, and results presented accordingly in external systems.

Another advantage of the present disclosure is a form management system that allows for the visual assembly of customizable fillable forms. Because fillable forms can be visually assembled by using the form management system, little or no programming knowledge or experience is necessary to create a fillable form that can automate interactions with users. After a fillable form is visually created within a form editor application provided by the form management system, the form management system can export the fillable form as an automated programming interface (API) that can be called into communication sessions of various communication platforms. In some embodiments, information received through a fillable form executed within a communication session of a communication platform is stored within a communications database and graphically presented within a communications management application.

DETAILED DESCRIPTION

Generally, software-automated apparatus and/or method is provided for one or more computer and/or network instant messaging programs that transmit text and/or other electronic file or media formats between program users. These programs may be used for personal communication and/or text dialogs, for example, between customers and suppliers in different type of "client" business/customer/group interaction, e.g., B2B, B2C, C2C, B2G, G2B, etc.

Preferably, computer-automated method and/or apparatus organizes dialog using fillable forms by electronically configuring a first processor associated with a first dialog participant coupled to a network according to at least one fillable form for structured participant communication, and electronically configuring a second processor associated with a second dialog participant coupled to the network according to at least one fillable form for structured participant communication, whereby a structured dialog between the first and second participants is enabled automatically by a network controller according to at least one fillable form, without terminating the structured dialog. Accordingly, the network controller manages the structured dialog according to a set of form questions posted on at least one fillable form, thereby simplifying communication between dialog participants.

Figure 1:
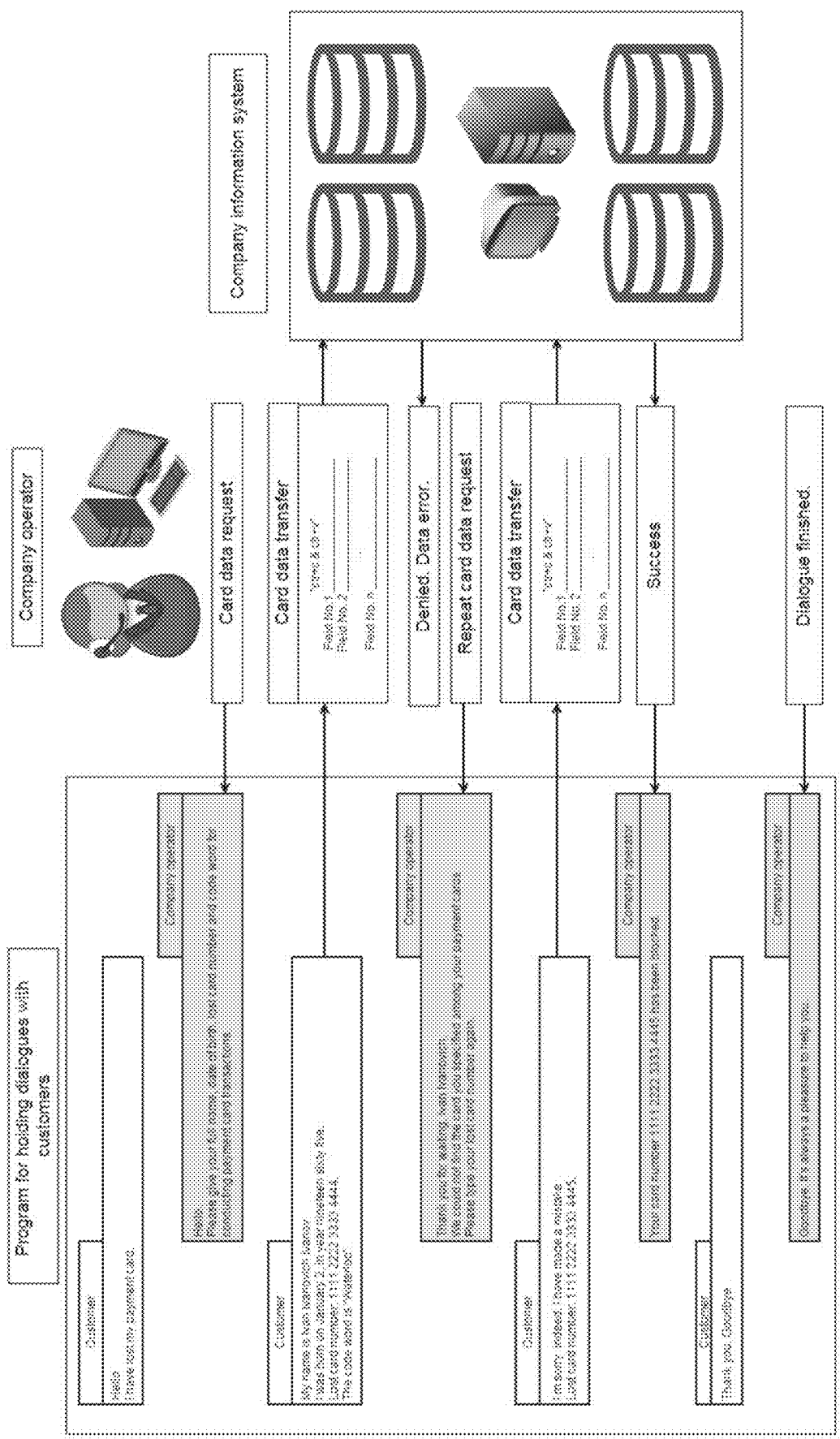
FIG. 1 illustrates a representative scheme of dialog, for example, between customer bank contact center operator regarding blocking of payment card lost by the customer.

FIG. 1 illustrates a representative scheme of dialog, for example, between customer bank contact center operator regarding blocking of payment card lost by the customer. As shown for typical dialog between bank customer and contact center, conventional communication among users in the form of chat dialogs often require transmission of bulky alphanumeric data from one dialog participant to another. FIG. 1 shows blocking of a payment card lost by the customer, in particular:

1) information requested by bank represented in different formats;
2) use of simple text field for data input not allowing either party to predefine for customer conveniently the format of transmitted data, causing complications in data usage by contact center operator, e.g., entering numeric information in words, etc.;
3) contact center operator being forced to interpret and transfer manually, or in best-case scenario using information copying methods, such as key combinations "ctrl-c" and "ctrl-v", the information received in chat dialog program to bank's programs with capacity to process customer and transaction data; and
4) errors made in course of data input and interpretation by operator making necessary to repeat requesting and receiving information from customer.

Thus, such transfer of requested data typically via manual input of information in program text window designed for chat dialogs has various deficiencies, such as:

1) lack of structure of text field data;
2) various presentation formats of user input data, e.g. numerous available data presentation formats;
3) time-consuming procedure for received information processing due to need to transfer data from chat window to other information systems; and
4) errors in process of manual text input and data transfer.

Figure 2:
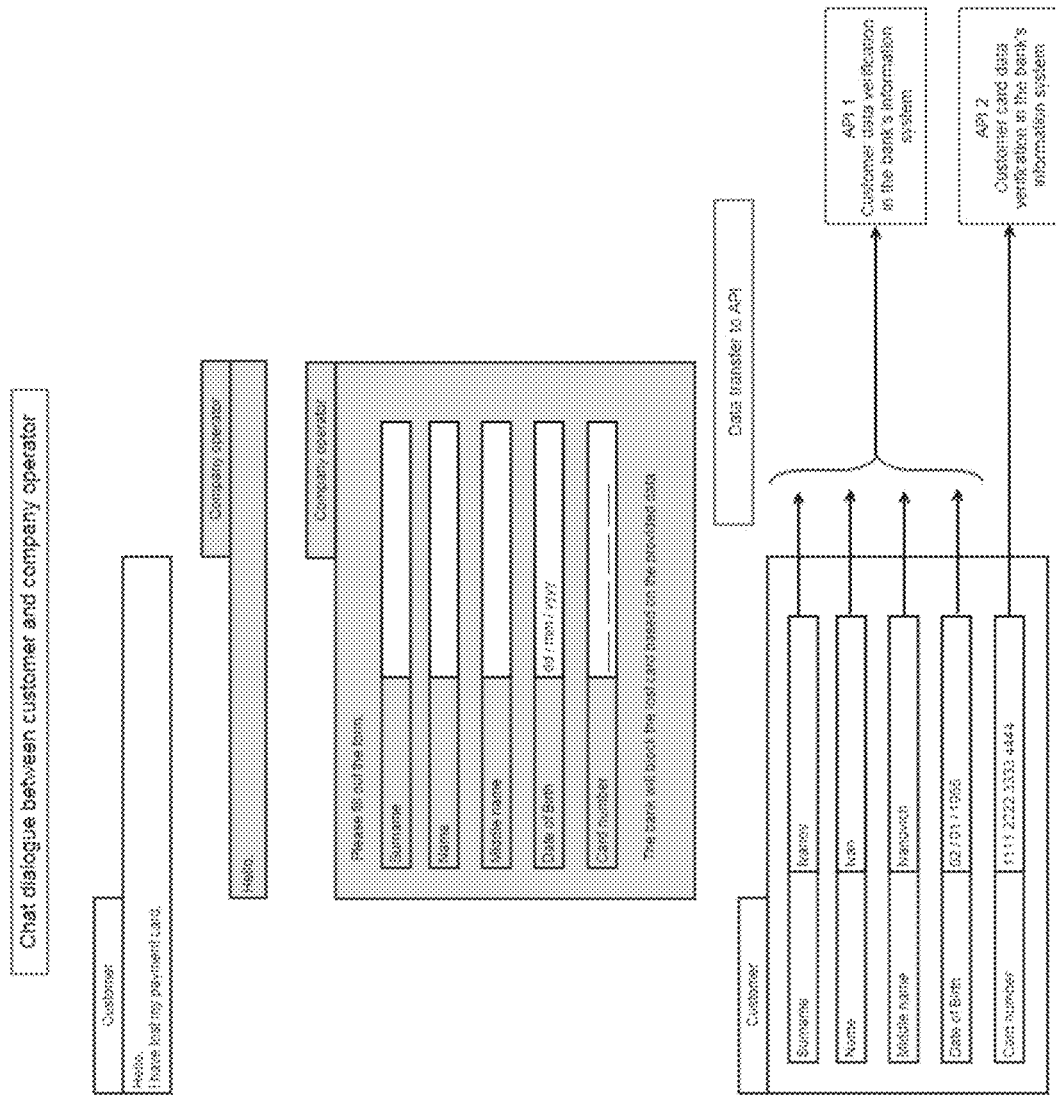
FIG. 2 illustrates one or more aspects of the present invention via schematic presentation of computer-automated network communication method steps using one or more forms in chat dialog, for example, between customer and bank contact center operator.

Significantly in comparison, FIG. 2 illustrates one or more distinctive aspects of the present invention via schematic presentation of computer-automated network communication method steps using one or more forms automated during chat dialog, for example, between customer and bank contact center operator. Preferably novel approach automates information input using structured messaging, thereby enabling processing of transmitted data without dialog termination.

FIG. 2 shows schematically using forms in chat dialog between customer and bank contact center operator, for example, whereby sample form indicates that after bank contact center operator identifies main point of customer inquiry, operator obtains data by offering customer to fill-out questionnaire form with preset data format, instead of posing sequence of questions inefficiently.

Preferably, automated form-filling transfers input data using automated application programming interface (API), without operator involvement and corresponding delay, thereby transmitting such data to company information system automatically according to set processing algorithm, thus giving efficient operator access to additional information. Optionally, data from different form fields is transmitted to one or more sub-programs (e.g., API, API1, API2, API3, etc.) connected with one or different parts of information system. And in this automated approach, one or more additional forms may be opened to facilitate information input for further processing.

Advantageously, such fillable form structured information input, transmission and processing approach serves to:

1) enhance efficiency of written communication between dialog participants
   via increased communication speed;
   simplification of communication process; and
   reduction of errors in process of information input and transfer.
2) improve quality of communication between dialog participants via dialog scenario management, e.g., sequencing questions posed, such as form demonstration, and processing results presented in external systems.

Figure 3:
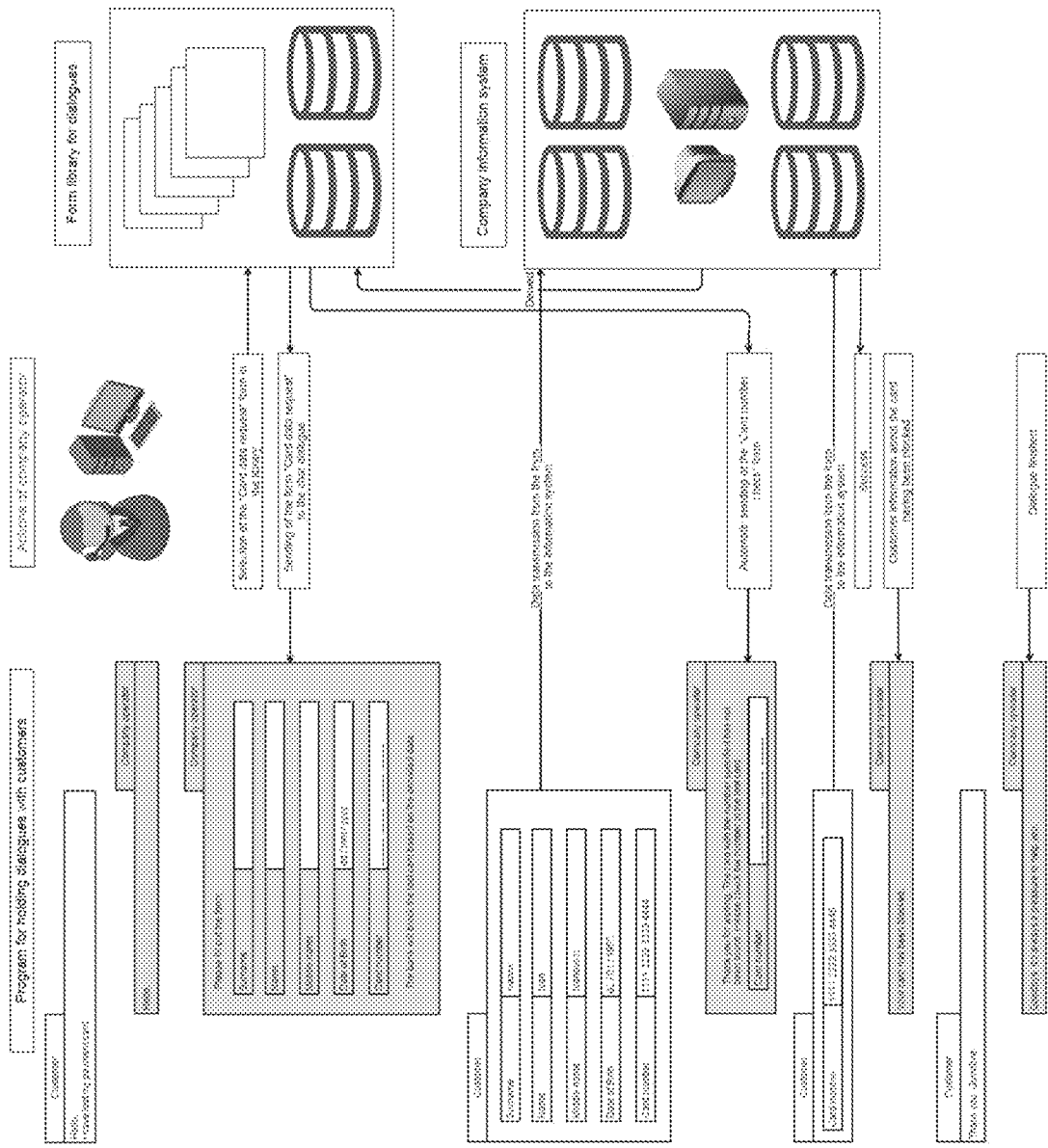
FIG. 3 illustrates one or more aspects of the present invention via schematic presentation of computer-automated network communication method steps using one or more forms in chat dialog, for example, between customer and bank contact center operator regarding blocking of payment card lost by the customer, whereby the operator uses structured form-based communication with the customer.

FIG. 3 illustrates one or more aspects of the present invention via schematic presentation of computer-automated network communication method steps using one or more forms in chat dialog, for example, between customer and bank contact center operator regarding blocking of payment card lost by the customer, whereby the operator uses structured form-based communication with the customer.

FIG. 3 dialog steps are similarly comparable to that shown in FIG. 1 in terms of content; however, there are significantly distinctive aspects with regard to predictive and/or adaptive FIG. 3 dialog, notably per following innovative benefits:

1) contact center operator performs fewer operations, and types less text due to automated pre-fillable form sending capability that eliminates redundant entry;
2) customer provides data in required structured format, i.e., not freely unstructured data;
3) data transferred directly from customer to information system, bypassing data interpretation and copying by operator;
4) revision of incorrect data (e.g., form "Card Number Check" sent automatically without operator involvement according to relevant API function dealing with payment card data accuracy checks); and
5) forms used are placed for operator conveniently in form library in company information system.

Figure 4:
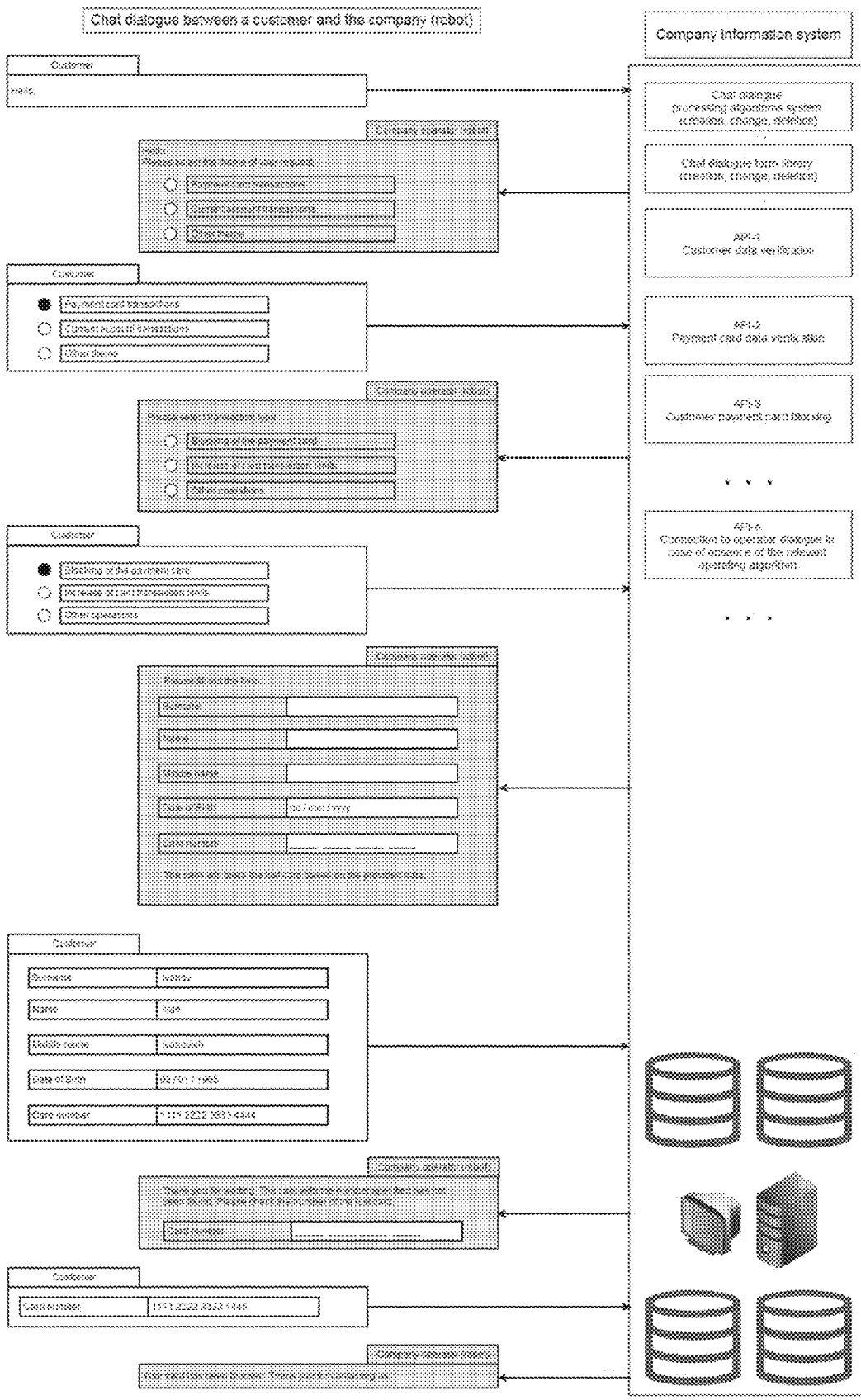
FIG. 4 illustrates one or more aspects of the present invention via schematic presentation of computer-automated network communication method steps using one or more forms in chat dialog, for example, between customer and bank contact center operator regarding blocking of payment card lost by the customer, whereby fully automated customer communication sends a sequence of forms.

Additionally, automating dialog management via structured messaging using chat forms may be implemented robotically via sequence of forms managed according to previous user-created algorithm with API-processed fields, thereby allowing yet further predictive and/or adaptive automation of the communications process. FIG. 4 illustrates one or more aspects of the present invention via schematic presentation of computer-automated network communication method steps using one or more forms sequentially in robot manner in chat dialog, for example, between customer and bank contact center operator regarding blocking of payment card lost by the customer, whereby fully automated customer communication sends a sequence of forms robotically.

FIG. 4 dialog steps are similarly comparable to those shown in FIGS. 1 and 3 in terms of content; however, there are significantly distinctive aspects with regard to robotically automated sequencing of forms in FIG. 4 dialog, notably per following innovative benefits:

1) dialog is maintained without involving operator due to organized functionality of chat dialog algorithm processing and availability of forms library;
2) dialog algorithm is chosen online based on information previously provided by customer, both in data form and option selection; and
3) depending on information received and results of processing the same with API, the dialog processing algorithm addresses different APIs, including the API for calling bank contact center operator.

Disclosed herein are systems, servers, methods, devices, and media for managing customizable fillable forms. As described above, fillable forms advantageously allow for the automation, organization, and management of electronic dialogs (hereinafter, "communication sessions"). In various embodiments of the present invention, provided herein is a form management system capable of creating, implementing, and managing customizable fillable forms. Advantageously, as described in further detail below, the form management system (FMS) allows users to visually assemble custom fillable forms within a form editor application that requires little or no programming knowledge or expertise to operate. Fillable forms created within the form management system are saved within the form management system and can be executed within communication platforms, such as through the use of an application programming interface (API). The fillable forms can then be used to automate communication sessions or parts of communications. In some embodiments, input received by a fillable form during a communication session is stored within one or more databases within the form management system and can be recalled for presentation within a communications management application provided by the form management system.

Figure 5:
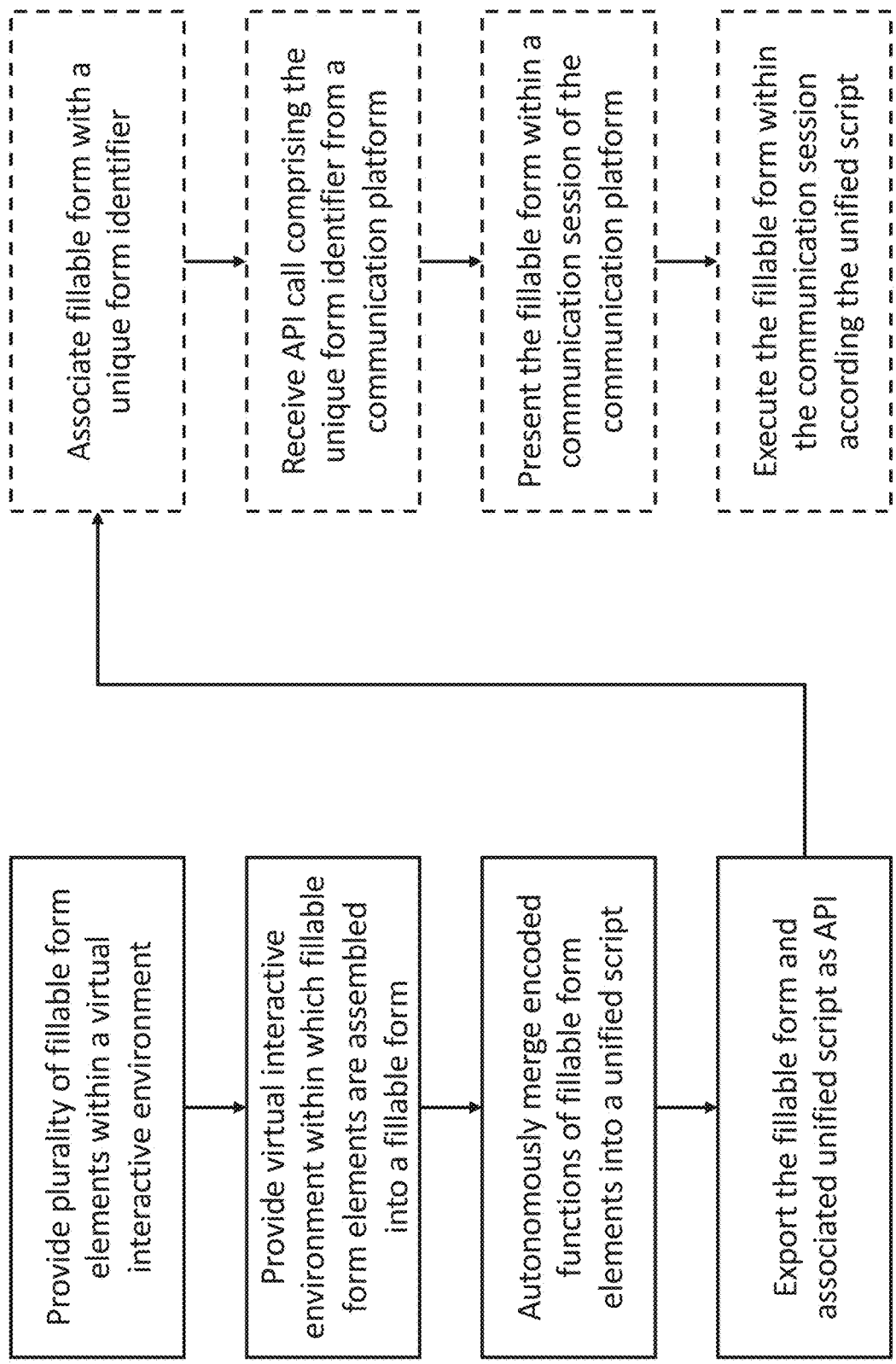
FIG. 5 depicts a flow diagram of a method for managing customizable forms by a form management system, in accordance with one embodiment of the present disclosure.

FIG. 5 depicts a flow diagram of a method for managing customizable forms by a form management system. In one aspect, disclosed herein is a method for managing customizable fillable forms by a form management system, the method comprising: a) providing a plurality of fillable form elements available for selection within a virtual interactive environment, each of the plurality of fillable form elements comprising a graphical representation and an encoded function; b) providing the virtual interactive environment, within which graphical representations of two or more fillable form elements are visually assembled into a fillable form; c) in response to the graphical representations of the one or more fillable form elements being visually assembled into the fillable form, autonomously merging encoded functions for each of the one or more fillable form elements into a unified script associated with the fillable form; and d) exporting the fillable form and associated unified script as an application programming interface (API). In some embodiments, the method further comprises: a) associating the fillable form with a unique form identifier; b) storing the fillable form and associated unified script in a fillable form database; c) receiving an API call comprising the unique form identifier from a first communication platform; d) presenting the fillable form within a first communication session of the first communication platform; and e) executing the fillable form within the first communication session according to the unified script. In some embodiments, executing the fillable form within the first communication session according to the unified script further comprises: a) accessing a third party database; b) retrieving data from the third party database; and c) presenting the data retrieved from the third party database within the first communication session through the fillable form. In some embodiments, the method further comprises: receiving first input through the fillable form during the first communication session; and b) storing the first input received through the fillable form during the first communication session in a communications database. In some embodiments, the method further comprises: a) retrieving the first input received through the fillable form during the first communication session from the communications database; and b) transmitting at least a portion of the first input from the communications database to a third party database using an API. In some embodiments, the method further comprises: a) retrieving the first input received through the fillable form during the first communication session from the communications database; and b) graphically presenting the first input within a communications management application.

In another aspect, disclosed herein is a method for managing customizable fillable forms by a form management system, the method comprising: a) receiving an API call comprising a unique form identifier from a communication platform; b) retrieving a fillable form and unified script associated with the unique form identifier from a fillable form database, the fillable form created within a form editor application by visually assembling two or more fillable form elements, each of the two or more fillable form elements comprising a graphical representation and an encoded function, wherein a merger module autonomously merges the encoded functions of the two or more fillable form elements into the unified script; c) returning the fillable form and unified script to the communication platform; d) presenting the fillable form within a communication session of the communication platform; and e) executing the fillable form within the communication session according to the unified script.

Figure 6:
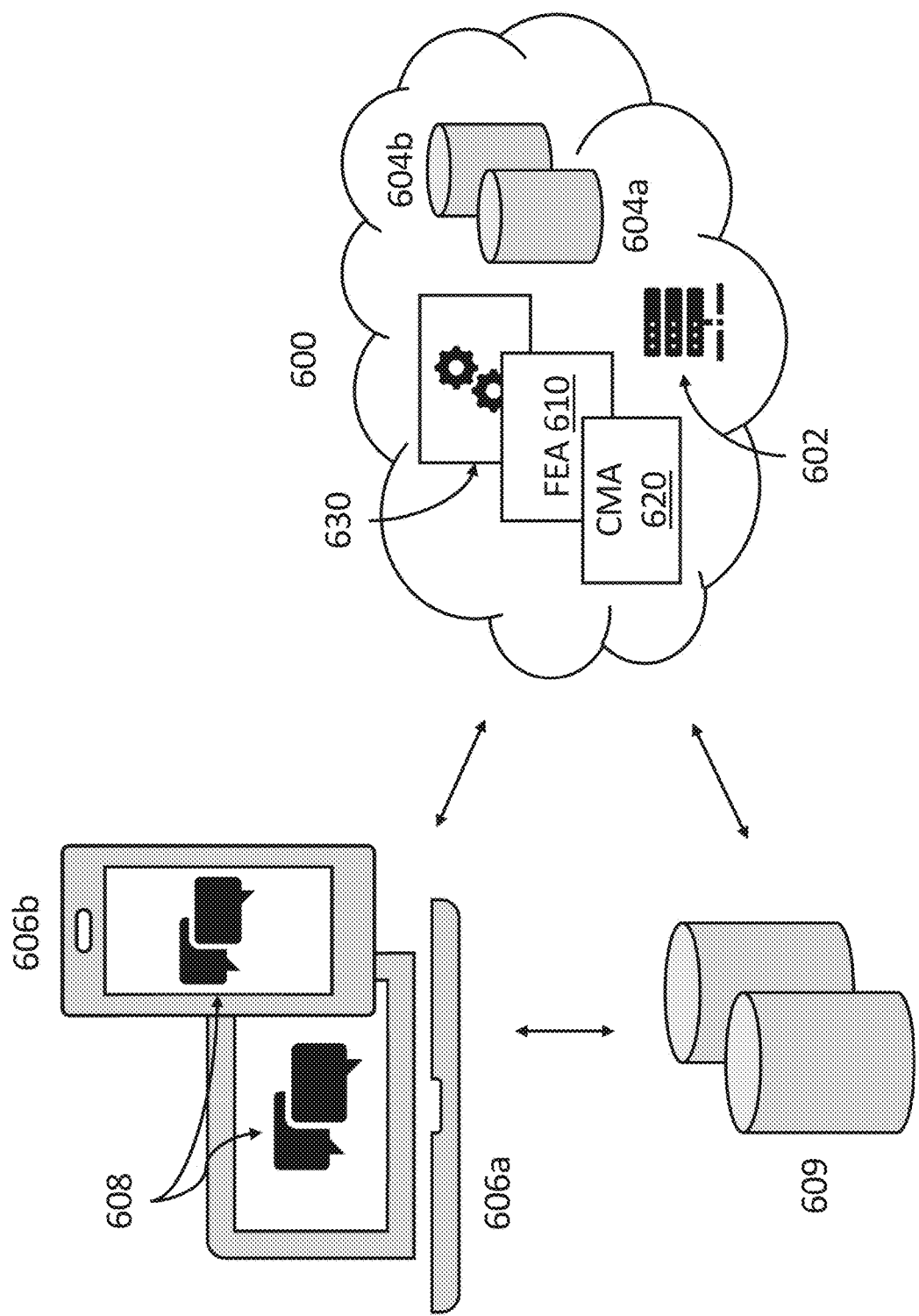
FIG. 6 depicts an exemplary embodiment of a form management system, in accordance with one embodiment of the present disclosure.

FIG. 6 depicts an exemplary diagram of a form management system (FMS) 600 in accordance with one embodiment of the present invention. In some embodiments, as depicted by FIG. 6, the form management system 600 includes one or more network servers 602, one or more databases 604, a form editor application 610, a form merger module 630, and a communications management application 620. In some embodiments, the one or more network servers 602 include one or more processors, microprocessors, microcomputers, microcontrollers, digital signal processors, central processing units, state machines, logic circuitries, and/or devices that manipulate signals based on operational instructions. In some embodiments, the form management system 600 includes one or more communication elements (not shown) that communicatively couple the form management system 600 to external devices and systems, such as a communication device 606 or a third party database 609, as described below. In some embodiments, the one or more communication elements are included in or otherwise coupled to the one or more network servers. 602 In some embodiments, the one or more databases 604 include a fillable form database 604a configured to store fillable forms created within the form editor application 610 (as described below) and a communications database 604b configured to store input received through fillable forms during communication sessions (as described below).

Figure 7A:
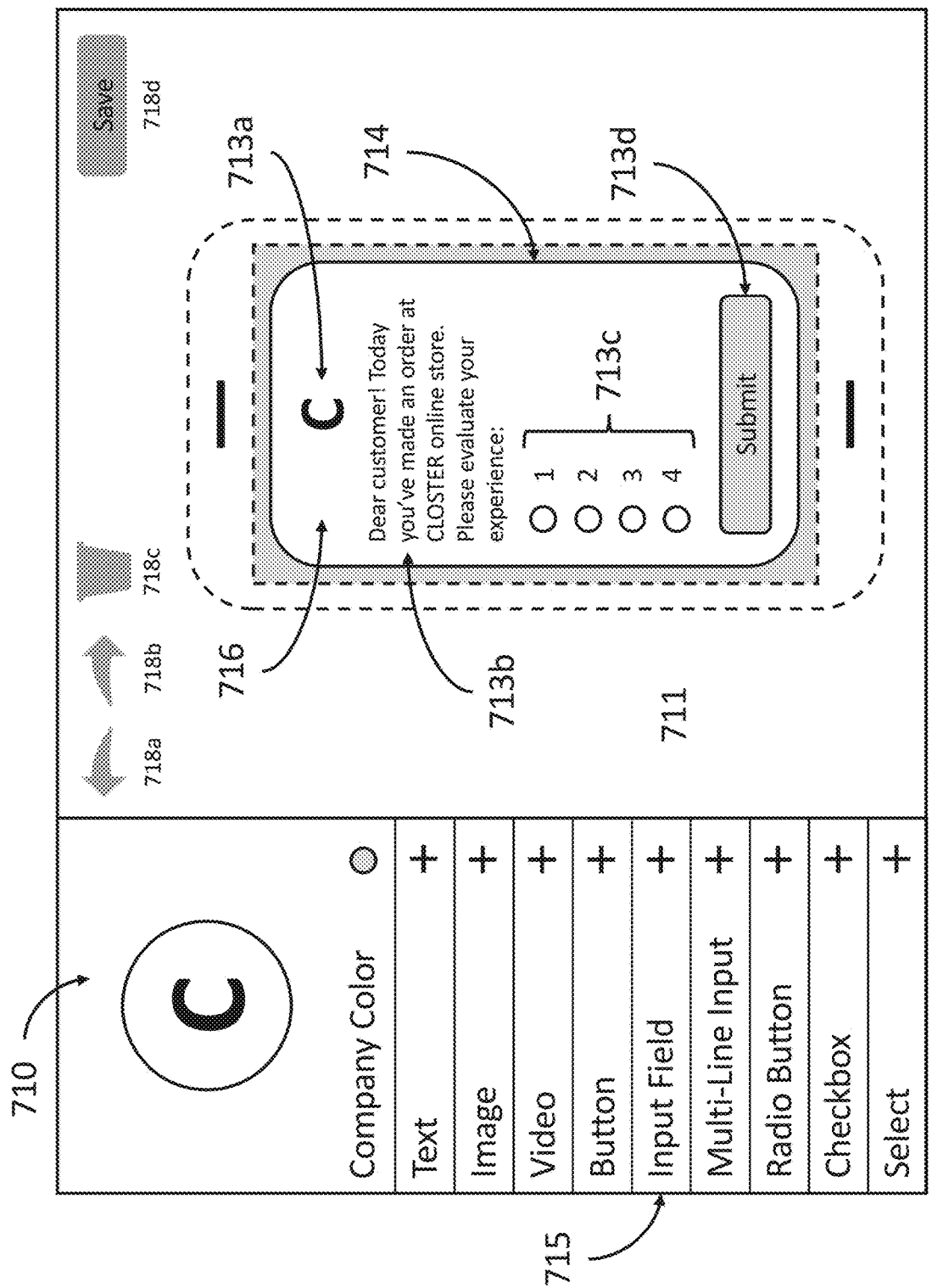
FIGS. 7A and 7B illustrates an exemplary embodiment of form editor application, in accordance with one embodiment of the present disclosure.
Figure 7B:
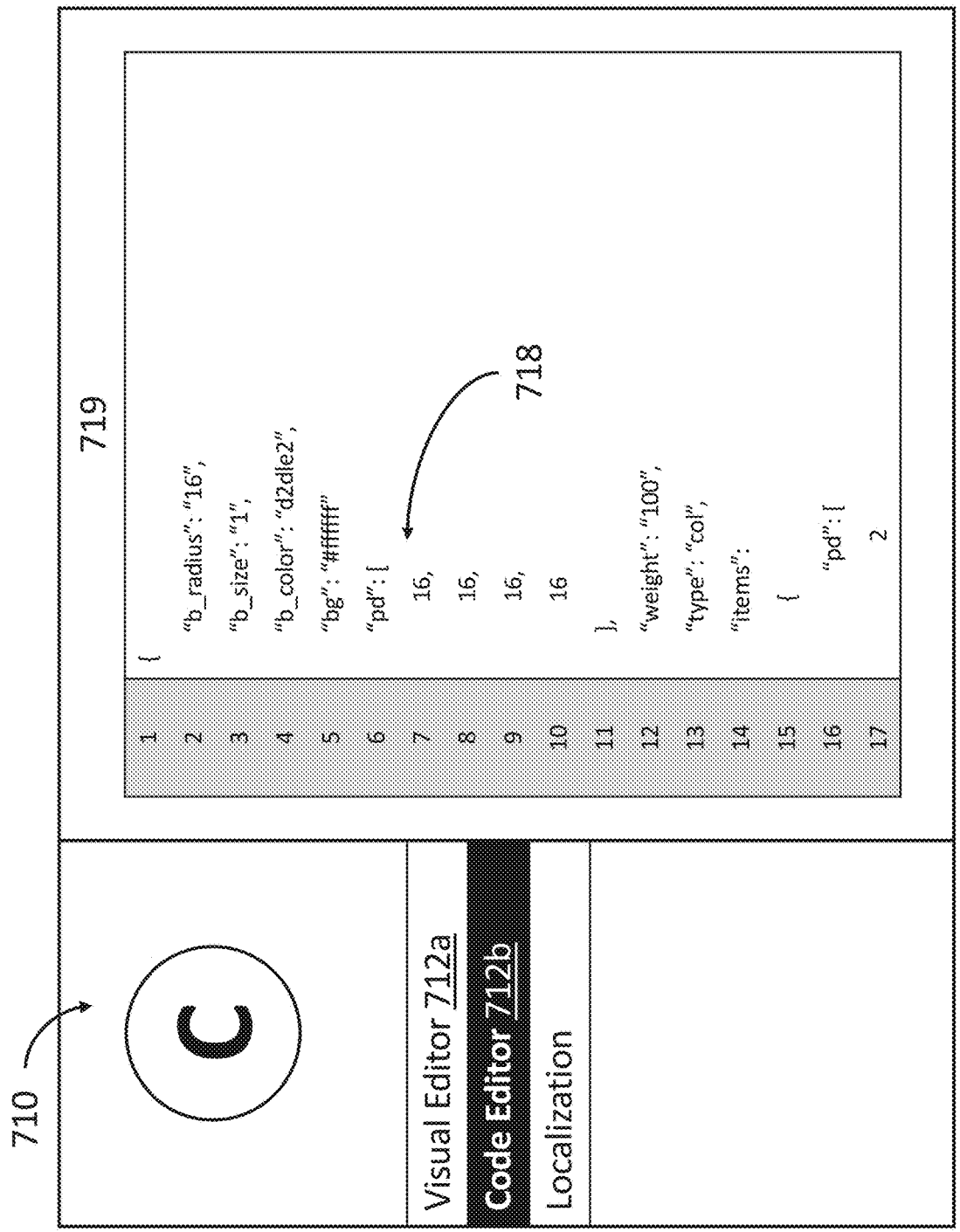

FIGS. 7A and 7B illustrate an exemplary embodiment of a form editor application 710, in accordance with one embodiment of the present invention. As mentioned above, in some embodiments, the form management system allows users to visually assemble custom fillable forms within a form editor application 710 that requires little or no programming knowledge or expertise to operate. In some embodiments, the form editor application 710 is a software program installed on a computing device. In some embodiments, the form editor application 710 is a website or web application accessible by a navigating to a URL within an internet browser. In such an embodiment, the form editor application 710 can be executed on the one or more network servers. In some embodiments, as depicted by FIG. 7A, the form editor application 710 provides a plurality of fillable form elements and a virtual interactive environment 711 (also referred to as a "visual editor") wherein one or more fillable form elements 713 can be visually assembled into a fillable form 716. In some embodiments, the creation of a fillable form begins with an empty visual container 714 provided in the virtual interactive environment 711 by the form editor application 710. A user can then select fillable form elements 713 from a form editor toolbar 715 and place the fillable form elements 713 into the visual container 714, thereby visually assembling the fillable form elements 713 into a fillable form 716. In some embodiments, a user places fillable form elements 713 into the visual container 714 by dragging and dropping individual fillable form elements 713 into the visual container 714. In some embodiments, as shown in FIG. 7A, the form editor application 710 includes an undo button 718a, a redo button 718b, a discard button 718c, and a save button 718d.

A fillable form element 713 is graphical element that can be used as a component of a fillable form 716. In some embodiments, a fillable form element 713 includes a graphical representation and an encoded value or function. An encoded function included in a fillable form element 713 includes instructions that influence the operation of a fillable form 716 when the fillable form 716 is executed during a communication session, as described below. In some embodiments, the fillable form elements 713 within the plurality of fillable form elements are organized into categories (or types) of fillable form elements. For example, in some embodiments, the form editor toolbar 715 provides "text," "image," "video," "button," "input field," "multi-input field," "radio button," "checkbox," and "select" categories of fillable form elements, as depicted by FIG. 7A. A category of fillable form elements may include one or more different fillable form elements 713. In some embodiments, each fillable form element 713 within the plurality of fillable form elements includes a category (or type) attribute that identifies the category of fillable form elements that each fillable form element 713 should be grouped into. In some embodiments, a fillable form element 713 may have multiple category (or type) attributes.

A "text" type fillable form element displays text within a fillable form during the execution of the fillable form within a communication session, as described below. An "image" type fillable form element displays a graphic image within a fillable form during the execution of the fillable form within a communication session. A "button" type fillable form element is a button that triggers an action or process to be executed when selected within a fillable form during the execution of the fillable form within a communication session. In some embodiments, a user can specify an action or process triggered to be performed or executed by the button by inputting an ID associated with the action or process into the encoded function of the button after placing the button into the visual container. A "text input" type fillable form element allows the entry of a short amount of text (e.g., a single line of text) within a fillable form during the execution of the fillable form within a communication session. A "multi-line input" (or "text area") type fillable form element allows the entry of a large amount of text (e.g., multiple lines of text) within a fillable form during the execution of the fillable form within a communication session. A "radio button" (or "radio") type fillable form element allows the selection of a single option from a predefined set of options (e.g., a single multiple choice option) within a fillable form during the execution of the fillable form within a communication session. A "checkbox" type fillable form element allows for the selection or deselection of multiple options from a predefined set of options (e.g., one or more multiple choice options) within a fillable form during the execution of the fillable form within a communication session. A "select" type fillable form element allows for the selection of the a value from a drop-down list of values within a fillable form during the execution of the fillable form within a communication session. In some embodiments, the form editor application 710 allows users to manipulate the visual appearance of a fillable form element 713. In some embodiments, the visual appearance of a fillable form element 713 includes size, shape, color, or font.

As mentioned above, a "button" type fillable form element triggers an action or process to be executed when selected within a fillable form during the execution of the fillable form within a communication session. In some embodiments, as mentioned above, a user can specify an action or process triggered to be performed or executed by the button by inputting an ID associated with the action or process into the encoded function of the button. However, any fillable form element 713 may be configured to trigger an action or process to be executed during the execution of a fillable form within a communication session. For example, in some embodiments, any fillable form element 713 (or subcomponent of a fillable form element) may be given an action property that triggers an action or process to be performed or executed during the execution of a fillable form. For example, a user may wish to have a particular selection within a "select" type fillable form element prompt a QR code scanner to be initiated when the particular selection is selected by a user during the execution of a fillable form within a communication session. To do so, the user can encode the particular selection with an action property. In some embodiments, such an encoded action property takes the form of: {"actions": [{"oper": "qrScan"}]}; wherein "actions" declares that an action is to be performed following selection of the particular selection by a user, "oper" defines the action that is to be performed, and "qrScan" is the ID of the particular action that is to be performed. In another example, {"actions": [{"oper": "callPhone", "phone": "380501234567" }]} prompts the execution of a phone call; wherein "phone" is the object or value type taken by the "callPhone" action, and "380501234567" is the particular phone number (value) that is to be dialed during the execution of the phone call. In some embodiments, the form management system includes a set of predefined actions within the one or more databases for users to select from while creating or editing fillable forms. In some embodiments, an action encoded into a fillable form element from the set of predefined actions can be called from the one or more databases following the selection of the fillable form element during the execution of a fillable form by using the ID associated with the action.

In some embodiments, an action triggered by a fillable form element during the execution of a fillable form within a communication session is performed partially or entirely by the form management system. In some embodiments, an action triggered by a fillable form element during the execution of a fillable form within a communication session is performed partially or entirely by a communication device hosting the communication session. For example, both the qrScan and callPhone actions at least partially employ physical components of a communication device in order to execute their respective actions—a QR code scanner requires a camera and a phone call requires a microphone and speaker. Other actions, however, may be completely performed by the form management system. In some embodiments, an action triggered by a fillable form element during the execution of a fillable form within a communication session may be partially or entirely performed by a third-party server. In some embodiments, an action triggered by a fillable form element during the execution of a fillable form within a communication session may send or retrieve data or information to or from a third-party database.

FIG. 7A illustrates an exemplary embodiment of the form editor application 710. As mentioned above, in some embodiments, the form editor application 710 includes a form editor toolbar 715, from which fillable form elements 713 may be selected, and a virtual interactive environment 711, in which fillable form elements 713 may be placed within a visual container 714 to visually assemble a fillable form. FIG. 7A additionally illustrates an exemplary embodiment of a visually assembled fillable form 716. The fillable form 716, as shown in FIG. 7A, includes four separate fillable form elements: an image fillable form element 713a, a text fillable form element 713b, a radio fillable form element 713c, and a button fillable form element 713d. The image fillable form element 713a shown in FIG. 7A is a logo of a company, Closter, for which the fillable form is being created. The text fillable form element 713b shown in FIG. 7A displays the text "Dear customer! Today you've made an order at CLOSTER online store. Please evaluate your experience:" within the fillable form 716. The radio fillable form element 713c shown in FIG. 7A allows for a single selection from four options presented within the fillable form: "1," "2," "3," and "4." Finally, the button fillable form element 713d shown in FIG. 7A is a submit button configured to transmit a selection from the radio fillable form element 713c to one or more recipients when selected.

In some embodiments, after a user places one or more fillable form elements 713 into a visual container 714, thereby creating a fillable form 716, the form management system automatically merges the encoded values and functions of the one or more fillable form elements into a unified script associated with the fillable form using a merger module. When a fillable form 716 is called during a communication session, as described below, the fillable form 716 is presented and executed within the communication session according to the unified script associated with the fillable form. In the exemplary visually assembled fillable form 716 shown in FIG. 7A, the image fillable form element 713a and text fillable form element 713b are only encoded with values (i.e., the image file of the company logo and the string of the text, respectively), while the radio fillable form element 713c and button fillable form element 713b are additionally encoded with functions (i.e., allowing for the selection of a single option from the four options presented and transmitting the selection from the radio fillable form element, respectively). Collectively, the four fillable form elements 713a-713d placed within the visual container 714 combine to create a fillable form 716 that, when executed within a communication session, prompts a user to rate their customer experience while shopping on the company's (CLOSTER's) online store, receives a rating from the user, and transmits the rating to one or more recipients. In this example, after a user places the four fillable form elements 713a-713d into the visual container 714, thereby creating a fillable form 716 (the particular fillable form depicted in FIG. 7A is hereinafter referred to as the "customer service" fillable form) constituting the four fillable form elements 713a-713d, the form management system employs the merger module to merge the encoded values and functions of the four fillable form elements 713a-713d into a unified script associated with the fillable form that, when the fillable form 716 is called during a communication session, presents the fillable form 716 (as shown within the virtual interactive environment) within the communication session and executes the fillable form 716 to achieve the objective stated above of prompting a user to rate their customer experience, receiving a rating from the user, and transmitting the rating to one or more recipients. In some embodiments, the form management system merges one or more fillable form elements 713 into a unified script in real-time as the one or more fillable form elements 713 are placed within a visual container 714. In some embodiments, the form management system merges one or more fillable form elements 713 into a unified script only once the one or more fillable form elements 713 are placed into a visual container 714 and the save button 718d is selected.

In some embodiments, as depicted in FIG. 7B, the form editor application 710 includes a code editor 719 that displays a unified script 718 generated for a fillable form 716 created within the form editor application 710. In some embodiments, the code editor 719 allows a user to directly edit the unified script 718, providing even further customizability of a fillable form 716. In some embodiments, the unified script 718 is presented within the code editor 718 in the form of a programming language, as shown in FIG. 7B. In some embodiments, the form editor application 710 allows users to toggle between the virtual interactive environment 711, wherein fillable form elements 713 may be placed into a visual container 714 to create a fillable form 716 for which the form management system automatically generates an associated unified script 718 (as described above), and the code editor 719, wherein a user may see or directly edit the unified script 718, by selecting between a visual editor button 712a and a code editor button 712b, as shown in FIG. 7B.

Figure 8:
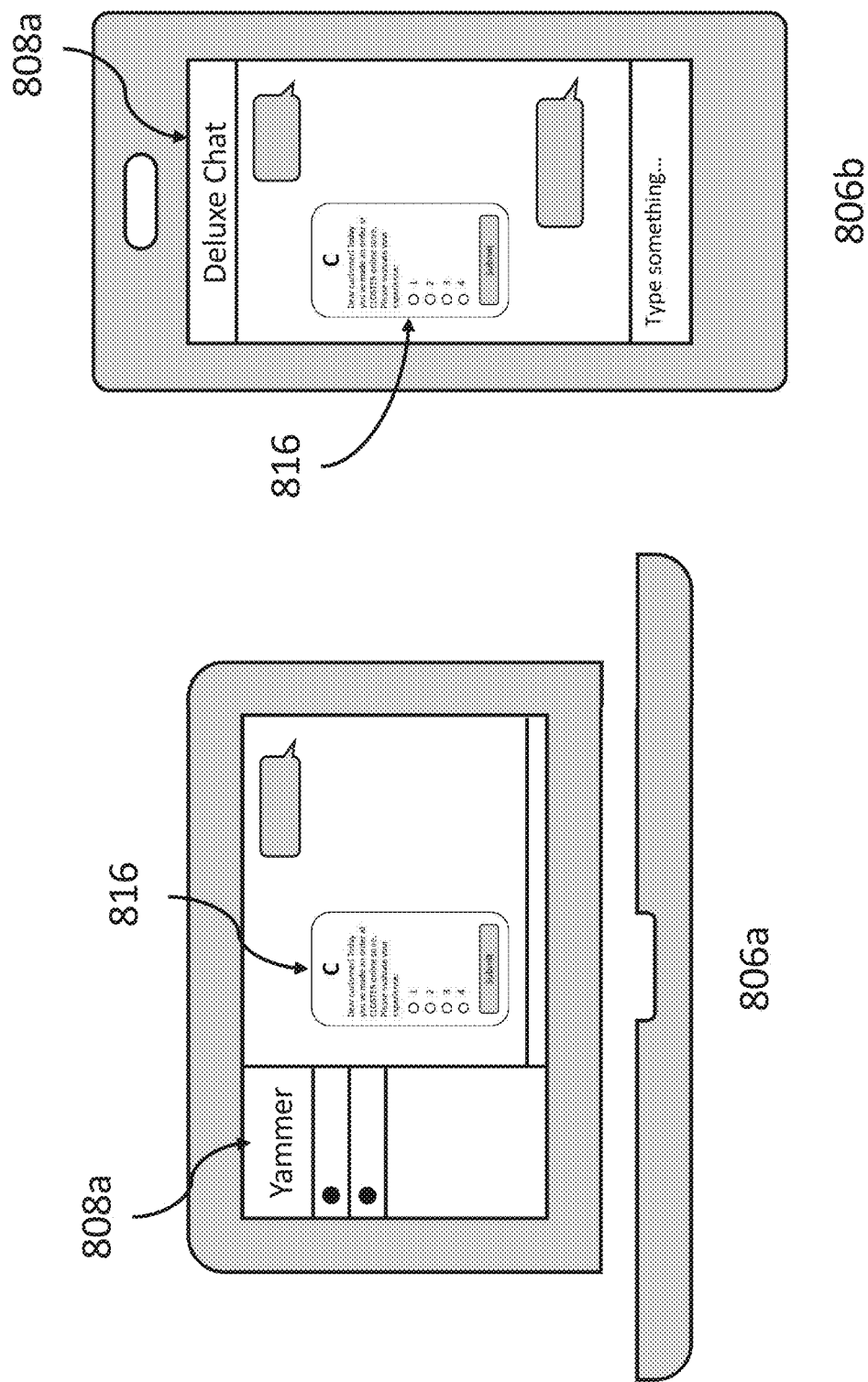
FIG. 8 illustrates exemplary embodiments of communication platforms, in accordance with one embodiment of the present disclosure.

FIG. 8 illustrates a fillable form 816 executed within a communication session of a communication platform 808. In some embodiments, after a fillable form has been created within the form editor application, the form management system compiles the fillable form and its associated unified script, saves the fillable form and its associated unified script within a fillable form database, and exports the fillable form and its associated unified script in a format that can be executed within communication platforms. For example, in some embodiments, the form management system exports a fillable form and associated unified script in the form of an application programming interface (API). In such an embodiment, the fillable form and its associated unified script can then be called from the fillable form database by a communication platform using an API call. In some embodiments, the form management system creates an identifier (ID; also referred to as a "unique form identifier") of the fillable form and stores the ID of the fillable form with the fillable form and associated unified script within the fillable form database. In some embodiments, the ID of the fillable form is included in an API call from a communication platform so that the form management system can identify the proper fillable form from the fillable form database.

In some embodiments, the form editor application allows a user to input key words or key terms that will trigger the execution of a fillable form within a communication session. In such an embodiment, the use of a key word or key term within a communication session of a communication platform prompts the communication platform to send an API call including the ID of the fillable form. In some embodiments, a fillable form can be triggered for execution within a communication session of a communication platform in response to the selection of an item or soft button by a user. In some embodiments, a fillable form can be triggered by a time or a location. For example, a fillable form can be programmed to be executed within a communication session at a particular time (e.g., 5 PM), or when a user enters a particular geographic region (e.g., Miami, Fla.), or when a user is in a particular geographic region at a particular time (e.g., Miami, Fla. at 5 PM). However, a fillable form may be triggered for execution within a communication session of a communication platform based on any type of event.

FIG. 8 depicts a fillable form 816 executed within two different communication sessions of two different communication platforms 808. The first communication platform 808a, Yammer, is being run on a laptop computer 806a. The second communication platform 808b, Deluxe Chat, is being run on a mobile phone 806b. In some embodiments, a communication platform 808 is any software application or program that allows for a virtual, text-based or graphic-based dialog to be held between two or more participants. Examples of communication platforms include Skype, Slack, Facebook Messenger, Viber, and WhatsApp. A communication session is a particular instance of two or more participants engaging in a dialog within a communication platform 808. In some embodiments, a communication session of a communication platform is initiated between a user of the communication platform (a first participant) and a representative account (a second participant; e.g., a phone number or email address registered on the communication platform) of an individual, company, or an organization that has created a fillable form within the form editor application provided by the form management system, as described above. Once a communication session of a communication platform has been initiated between the first participant (the user) and the second participant (the representative account of the individual, company, or organization), the fillable form may be triggered for execution within the communication session in a variety of ways. For example, in some embodiments, the fillable form is triggered for execution within the communication session by a key word or key term, as described above. For example, in one embodiment, the "customer service" fillable form (described above) can be triggered for execution if the first participant uses the term "customer service" in a message sent to the second participant within the communication session. In some embodiments, the fillable form is triggered for execution by the initiation of the communication session. In some embodiments, when the fillable form is triggered for execution, the communication platform 808 sends an API call including an identifier (ID) of the fillable form to the form management system, as described above. The form management system, after receiving the API call, uses the ID of the fillable form to retrieve the fillable form and associated unified script from the fillable form database. The form management system can then transmit the fillable form and unified script to the communication platform 808, which in turn presents the fillable form within the communication session and executes the fillable form within the communication session according to the unified script, as described above.

Once the fillable form is called from the fillable form database, transmitted to the requesting communication platform 808, and executed with the communication session of the communication platform, as described above, the first participant can interact with the fillable form according to the objective of the fillable form. For example, as shown in FIG. 8, the "customer service" fillable form (described above with respect to FIG. 7A) is presented within both a communication session of the Yammer communication platform 808a and a communication session of the Deluxe Chat communication platform 808b. In either communication session, a first participant can select a rating for their customer experience and submit the rating to one or more recipients using the "customer service" fillable form.

Figure 9:
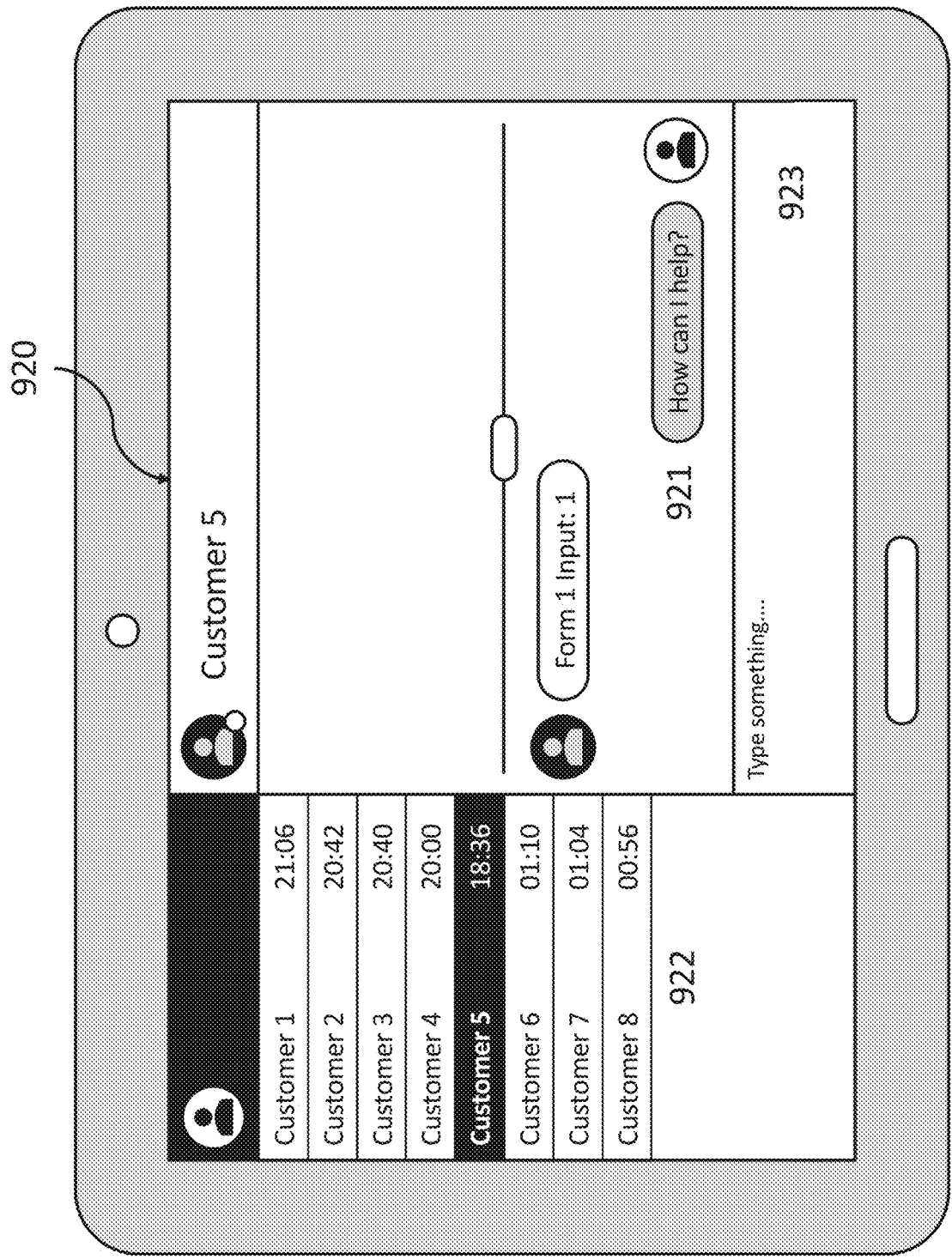
FIG. 9 illustrates an exemplary embodiment of a communications management application, in accordance with one embodiment of the present disclosure.

FIG. 9 depicts an exemplary embodiment of a communications management application 920. In some embodiments, when a fillable form created using the form editor application is executed within a communication session of a communication platform, the form management system stores input received through the fillable form in a communications database. The form management system can then retrieve the input received through the fillable form and graphically present (or display) the input received through the fillable form within the communications management application 920. In some embodiments, a user can send a message 921 to a first participant of a communication session through the communications management application 920. For example, customer 5 is the first participant of the communication session of the Deluxe Chat communication platform depicted in FIG. 8. Customer 5 submits a customer satisfaction rating of 1 out of 4 (the lowest possible rating). The user who created the "customer service" fillable form can access the communications management platform 920, select customer 5 from a communications menu 922, and see that customer 5 has submitted a customer satisfaction rating of 1 out of 4. The user can then send a message to customer 5 through a chat interface 923 in the communications management platform 920 to ask customer 5 how they can assist customer 5 or why customer 5 submitted a low customer satisfaction rating.

FIG. 9 illustrates an exemplary embodiment of a communications management application. As depicted in FIG. 8, a fillable form created using the form editor application can be called into any number of communication sessions of any number of communication platforms. In the example depicted in FIG. 8, the "customer service" fillable form has been called and executed in a first communication session of a first communication platform (Yammer) and a second communication session of a second communication platform (Deluxe Chat). In such an embodiment, the form management system can retrieve first input received through the fillable form within the first communication session of the first communication platform and retrieve second input received through the fillable form within the second communication session of the second communication platform from the communications database and then graphically present both the first input and second input simultaneously within the communications management application 920. For example, as described in the example above, customer 5 is the first participant in the of the communication session of the Deluxe Chat communication platform depicted in FIG. 8. In this example, customers 2, customer 3, and customer 7 are all first participants of separate communication sessions of the Deluxe Chat communication platform. Customer 1, customer 4, customer 6, and customer 8 are all first participants of separate communication sessions of the Yammer communication platform. However, as depicted in FIG. 9, each one of their communication sessions is graphically presented within the communications management application 920 simultaneously because of their interactions with the "customer service" fillable form. Similarly, the "customer service" fillable form could be called and executed in a first communication session of a first communication platform (e.g., Yammer) and a second communication session of the first communication platform. In such an embodiment, the form management system can retrieve first input received through the fillable form within the first communication session of the first communication platform and retrieve second input received through the fillable within the second communication session of the first communication platform from the communications database and then graphically present both the first input and second input simultaneously within the communications management application 920. In this way, the communications management application 920 allows a user that created a fillable form within the form editor application to see and manage all of the interactions with their fillable form across any number of communication sessions of any number of communication platforms in one consolidated place. In some embodiments, the communications management application 920 is a website or web application accessible by navigating to a URL within an internet browser.

Foregoing descriptions of specific embodiments of the invention have been presented for purposes of illustration and description. They are not intended to be exhaustive or to limit the invention to the precise forms disclosed. Modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents. It is contemplated herein that automated approach for improving form-based messaging is embodied electronically in one or more computing devices accessible in one or more coupled digital networks, such as processors, controllers, servers, as well as wireless mobile devices such as cellular/smartphones, and various internet-of-things (IOT) type devices enabled with network communication and programmable capability.

What is claimed is:

1. A method for managing customizable fillable forms by a form management system, the method comprising:
   providing a plurality of fillable form elements available for selection within a virtual interactive environment, each of the plurality of fillable form elements comprising a graphical representation and an encoded function;
   providing the virtual interactive environment, within which graphical representations of two or more fillable form elements are visually assembled into a fillable form;
   in response to the graphical representations of the one or more fillable form elements being visually assembled into the fillable form, autonomously merging encoded functions for each of the one or more fillable form elements into a unified script associated with the fillable form;
   exporting the fillable form and associated unified script as an application programming interface (API);
   receiving a first API call and a second API call from a first communication platform, wherein the first and second API calls comprise a unique identifier form identifier associated with the fillable form;
   presenting the fillable form within a first communication session and a second communication session of the first communication platform;
   executing the fillable form within the first communication session and the second communication session according to the unified script;
   receiving first input through the fillable form during the first communication session and second input through the fillable form during the second communication session;
   storing the first and second input in a communications database; and
   graphically presenting the first input and second input simultaneously within a communications management application.

2. The method of claim 1, wherein executing the fillable form within the first and second communication sessions according the unified script further comprises:
   accessing a third party database;
   retrieving data from the third party database; and
   presenting at least a portion of the data retrieved from the third party database within the first and second communication sessions through the fillable form.

3. The method of claim 1, further comprising
   transmitting at least a portion of the first or second input from the communications database to a third party database using an API.

4. The method of claim 1, wherein the virtual interactive environment allows for the manipulation of the visual appearance of the plurality of fillable form elements.

5. The method of claim 1, further comprising:
   displaying the unified script within the virtual interactive environment; and
   allowing editing of the unified script within the virtual interactive environment.

6. A system for managing customizable fillable forms by a form management system, the system comprising:
   a network server comprising one or more processors and configured to:
      provide a plurality of fillable form elements available for selection within a virtual interactive environment, each of the plurality of fillable form elements comprising a graphical representation and an encoded function;
      provide the virtual interactive environment, within which graphical representations of two or more fillable form elements are visually assembled into a fillable form;
      in response to the graphical representations of the two or more fillable form elements being visually assembled into the fillable form, autonomously merging encoded functions for each of the two or more fillable form elements into a unified script associated with the fillable form;
      export the fillable form and associated unified script as an application programming interface (API);
      receive a first API call and a second API call from a first communication platform, wherein the first and second API calls comprise a unique identifier form identifier associated with the fillable form;
      present the fillable form within a first communication session and a second communication session of the first communication platform;
      execute the fillable form within the first communication session and the second communication session according to the unified script;
      receive first input through the fillable form during the first communication session and second input through the fillable form during the second communication session;
      store the first and second input in a communications database; and
      graphically present the first input and second input simultaneously within a communications management application.

7. The system of claim 6, wherein executing the unified script prompts the first communication platform to:

access a third party database;
retrieve data from the third party database; and
a. present at least a portion of the data retrieved from the third party database within the first and second communication sessions through the fillable form.

8. The system of claim 6, wherein the network server is further configured to
transmit the at least a portion of the first input from the communications database to a third party database using a second API.

9. The system of claim 6, wherein the virtual interactive environment allows for the manipulation of the visual appearance of the plurality of fillable form elements.

10. The system of claim 6, wherein the network server is further configured to:
display the unified script within the virtual interactive environment; and
allow editing of the unified script within the virtual interactive environment.

\* \* \* \* \*